United States Patent [19]

Jinzaki

[11] Patent Number: 5,077,655
[45] Date of Patent: Dec. 31, 1991

[54] COMMUNICATION CONTROL DEVICE IN COMPUTER SYSTEM

[75] Inventor: Akira Jinzaki, Yamato, Japan

[73] Assignee: Fujitsu Limited, Kawasaki, Japan

[21] Appl. No.: 234,033

[22] Filed: Aug. 19, 1988

[30] Foreign Application Priority Data

Aug. 20, 1987 [JP] Japan .................. 62-207108

[51] Int. Cl.⁵ .......................................... G06F 3/00
[52] U.S. Cl. ........................... 395/200; 364/229;
364/239; 364/210.8; 364/284; 364/284; 364/3;
364/DIG. 7
[58] Field of Search ... 364/200 MS File, 900 MS File;
370/60, 85, 94

[56] References Cited

U.S. PATENT DOCUMENTS

| | | | |
|---|---|---|---|
| 4,261,033 | 4/1981 | Lemay et al. | 364/200 |
| 4,271,518 | 6/1981 | Birzele et al. | 364/200 |
| 4,333,143 | 6/1982 | Calder | 364/200 |
| 4,396,983 | 8/1983 | Segarra et al. | 364/200 |
| 4,493,021 | 1/1985 | Agrawal et al. | 364/200 |
| 4,543,627 | 9/1985 | Schwab | 364/200 |
| 4,590,468 | 5/1986 | Stieglitz | 364/200 |
| 4,604,683 | 8/1986 | Russ et al. | 364/200 |
| 4,667,287 | 5/1987 | Allen et al. | 364/200 |
| 4,672,570 | 6/1987 | Benken | 364/900 |
| 4,682,304 | 7/1987 | Tierney | 364/900 |
| 4,716,525 | 12/1987 | Gilanyi et al. | 364/200 |
| 4,723,208 | 2/1988 | Chadima, Jr. et al. | 364/200 |
| 4,744,023 | 5/1988 | Welsch | 364/200 |
| 4,773,001 | 9/1988 | Blair et al. | 364/200 |
| 4,777,591 | 11/1988 | Chang et al. | 364/200 |
| 4,777,595 | 10/1988 | Strecker et al. | 364/200 |
| 4,811,277 | 3/1989 | May et al. | 364/900 |

FOREIGN PATENT DOCUMENTS 58-024254 2/1983 Japan .

Primary Examiner—Stuart N. Hecker
Assistant Examiner—Rebecca L. Rudolph
Attorney, Agent, or Firm—Staas & Halsey

[57] ABSTRACT

A communication control device connected through at least one network to a computer system for carrying out transmitting processing and receiving processing of data in accordance with a communication protocol includes: a transmitting processing unit for setting an information address of communication control information stored in a table in a communication data frame having a communication data and transmitting the communication data frame; a receiving processing unit for receiving the communication data frame and a response data frame having the information address; and a response inspection processing unit for inspecting the response data frame received by the receiving processing unit, accessing the communication control information set in the table using the information of the communication control information obtained from the response data frame, and carrying out a transmitting completion processing or re-transmitting processing based on the accessing.

16 Claims, 9 Drawing Sheets

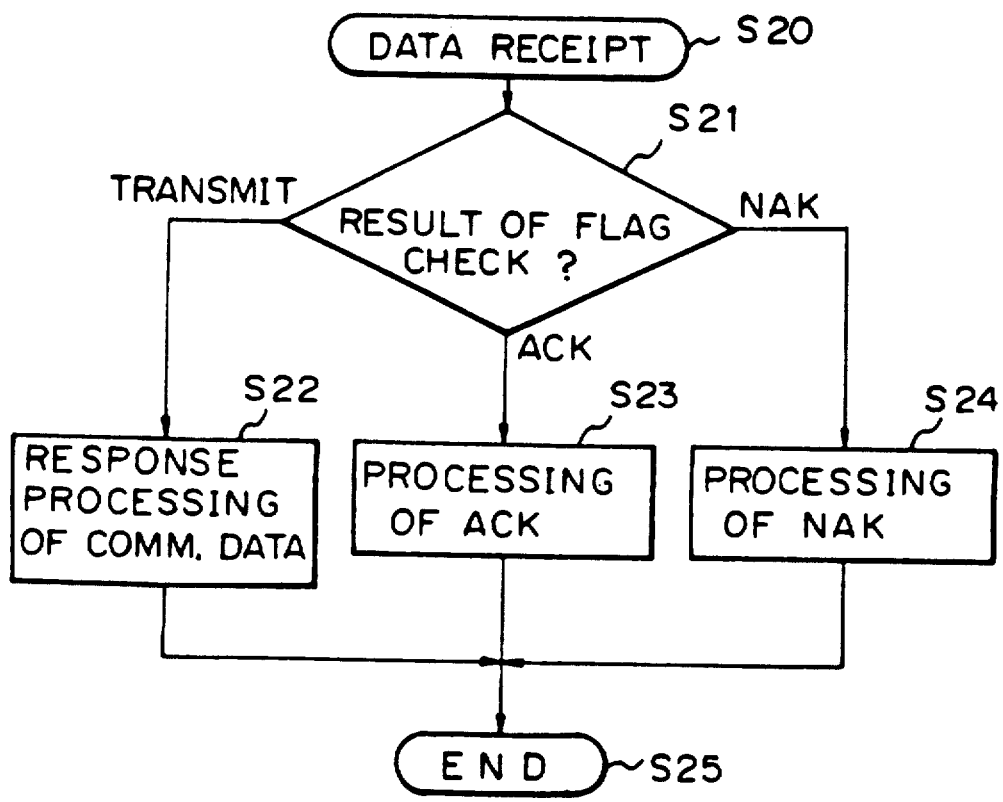

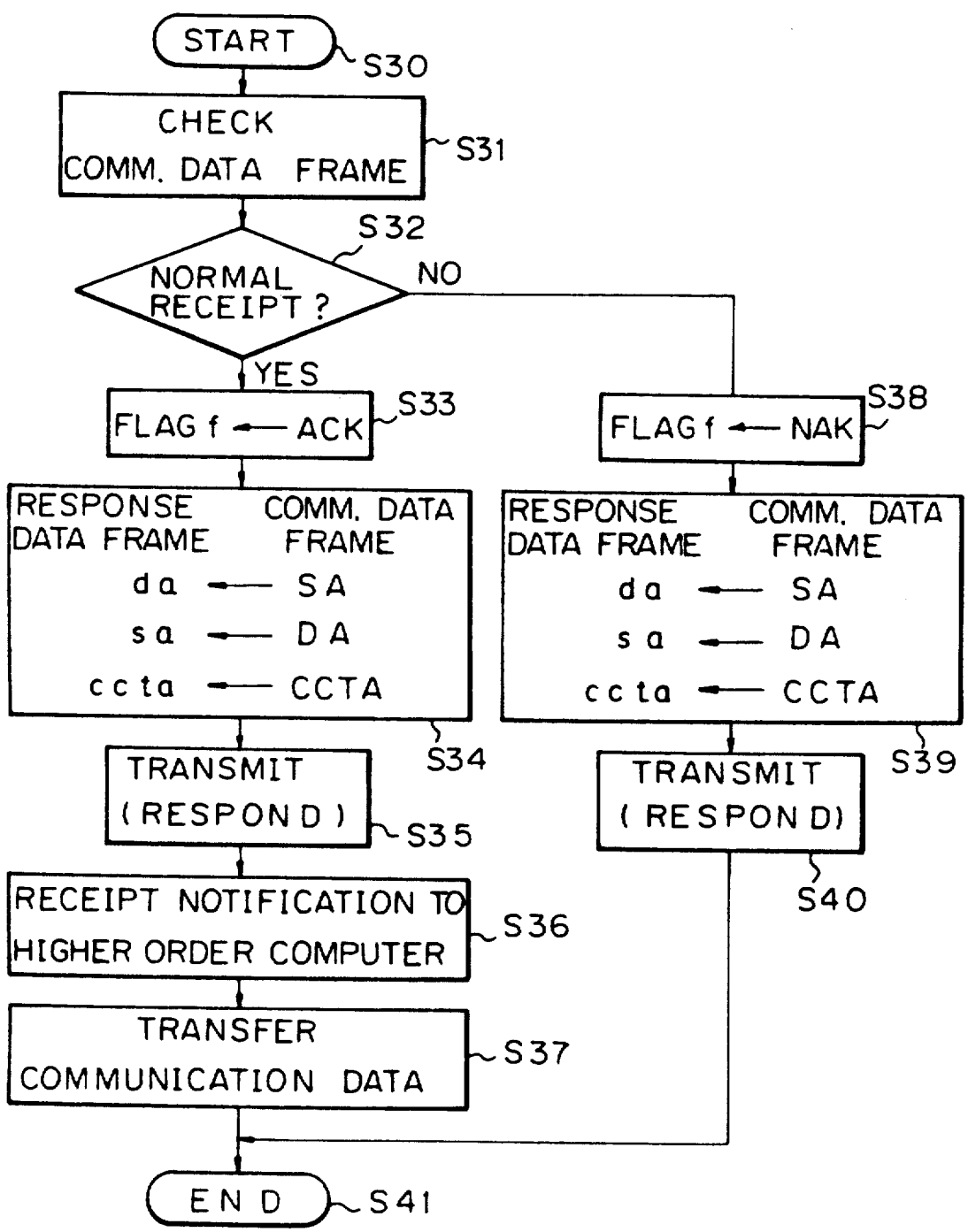

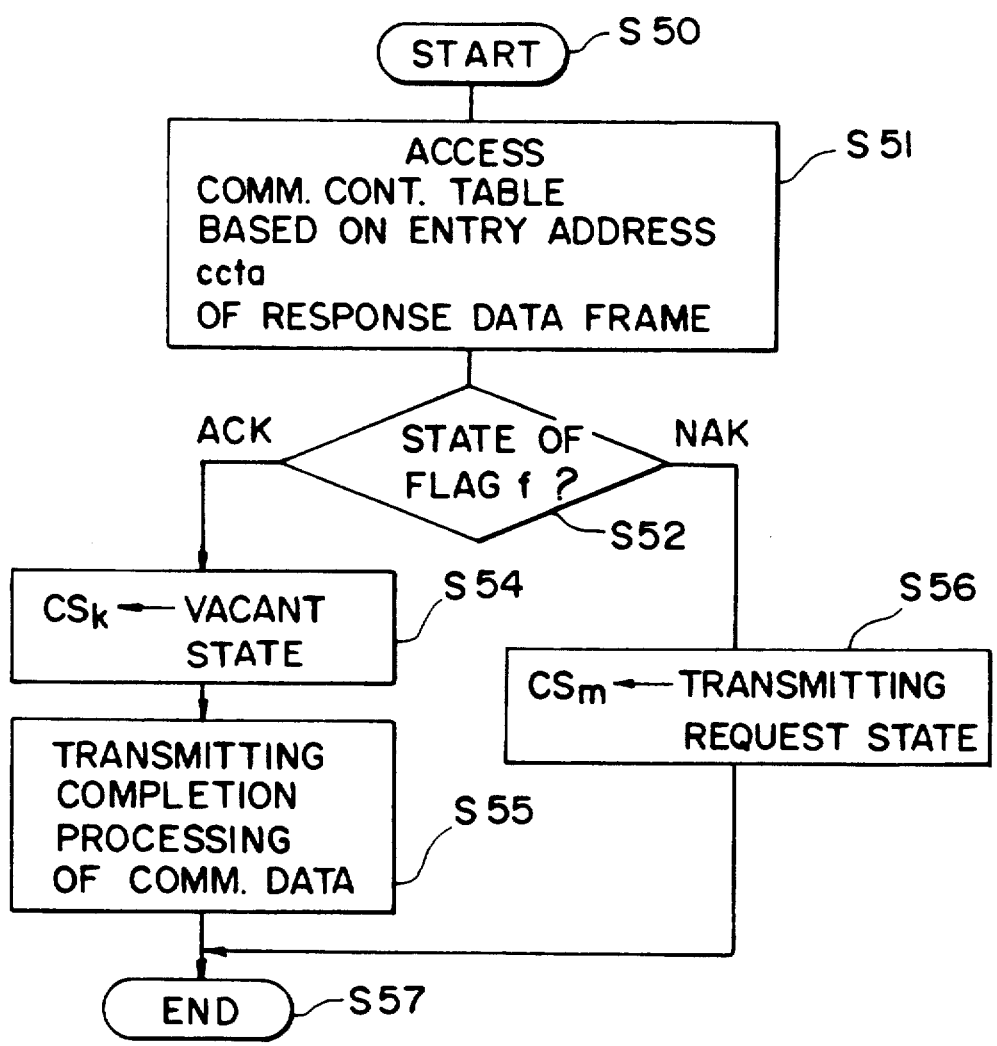

COMMUNICATION CONTROL DEVICE IN COMPUTER SYSTEM

BACKGROUND OF THE INVENTION

1. Field of the Invention

The present invention relates to a communication control device in a computer system. The system according to the present invention is used for communication control in a distributed type electronic computer system connected through networks including, for example, data bus, loop transmission line, and the like 2. Description of the Related Arts In general, in an inter-computer communication, a communication protocol is used for carrying out the detection and correction of errors in communication data and for controlling of the flow of communication data between a transmitting side and a receiving side. In the communication protocol, an analysis of destination address information, data sequence information, and communication command is carried out. Such an operation is generally realized by software control.

Assuming that a plurality of computers are interconnected via a plurality of communication control devices and a network, then in general, in accordance with a request for transmitting at a communication control device as a transmitting node, communication data is transmitted in the form of a communication data frame from the transmitting node, based on a predetermined protocol processing. Upon receipt of this communication data frame by the receiving node, a response processing of this communication data frame is carried out at the receiving node.

When the receipt at the receiving node is a normal receipt, "ACK" information, which is acknowledge information, is returned to the transmitting node, and the communication data is transmitted, to a higher order computer to complete the receiving. On the other hand, when the receipt at the receiving node is an abnormal receipt, "NAK" information, which is negative acknowledge information, is returned to the transmitting node. At the transmitting node which receives "NAK" information, a response data inspection process is carried out. When the response data is "NAK", a re-transmitting process of the corresponding communication data is carried out, and when the response data is "ACK", the transmitting is completed.

In general, a communication control device as a node, collects communications from a plurality of computers, and must carry out a plurality of transmitting and receiving processing operations. If n transmitting operations are carried out by a communication control device, the communication control device will receive n response signals, each of which is either ACK or NAK. There are differences between receiving processing time in receiving nodes, and between delays in communications in the network. Accordingly, the returns of the response data are carried out independent of the order of the transmitting of the communication control device. As a result, transmitted communication data does not necessarily have a time-correspondence relationship with the corresponding response data. Thus, it is necessary to arrange the transmitted communication data and the received response data in a time-correspondence relationship. Therefore, it is necessary to search the communication control table in which the communication control information is stored.

Under these circumstances, if the number n of the above-mentioned transmitting processings is large, the time-length required for the search becomes considerably long and cannot be neglected. Hence, the speed of operation of the device is lowered. This constituents a disadvantage of the prior art. In many cases, the above-described search is carried out by software. Assuming that the time required for a search and comparison of one entry of a communication control table by software is Tc, the time required for a search and comparison of one entry out of n entries in the binary search algorithm will be, on average, $\log_2 n \times Tc$. Assuming that the instruction required for search and comparison concerning 1 entry is constituted by five computer instructions, and a computer having a processing speed of $10^6$ instructions/sec is used, the time length required for the search will be $5 \times \log_2 n \times 10^{-6}$ sec; i.e., this time length required for the search will be 40 μsec for n=256. This long time length required for a search constitutes a disadvantage of the prior art.

SUMMARY OF THE INVENTION

It is an object of the present invention to provide an improved communication control device in a computer system in which the speed of a response inspection processing in a communication protocol processing is increased, and accordingly, the resulting speed of the communication in a computer system is increased.

According to the present invention, there is provided a communication control, device connected through at least one network to a computer system for carrying out a transmitting processing and a receiving processing in accordance with a communication protocol, the device including: a transmitting processing unit for setting address information of communication control information stored in a table in a data frame of communication data and transmitting the data frame; a receiving processing unit for receiving the data frame; and a response inspection processing unit for inspecting a response data frame received by the receiving processing unit, accessing the communication control information set in the data frame using returned address information of the communication control information, and carrying out transmitting completion processing or re-transmitting processing based on that access.

BRIEF DESCRIPTION OF THE INVENTION

In the drawings:

FIG. 5, FIG. 6, FIG. 7, FIG. 8, and FIG. 9 are flow charts of the operation of the device of FIG. 3.

DESCRIPTION OF THE PREFERRED EMBODIMENTS

Before describing the preferred embodiments of the present invention, a system of inter-computer communication, to which the device according to the present invention can be applied, is described with reference to FIG. 1, and an example of communication protocol used in such a system of inter-computer communication is described with reference to FIG. 2.

Figure 1:
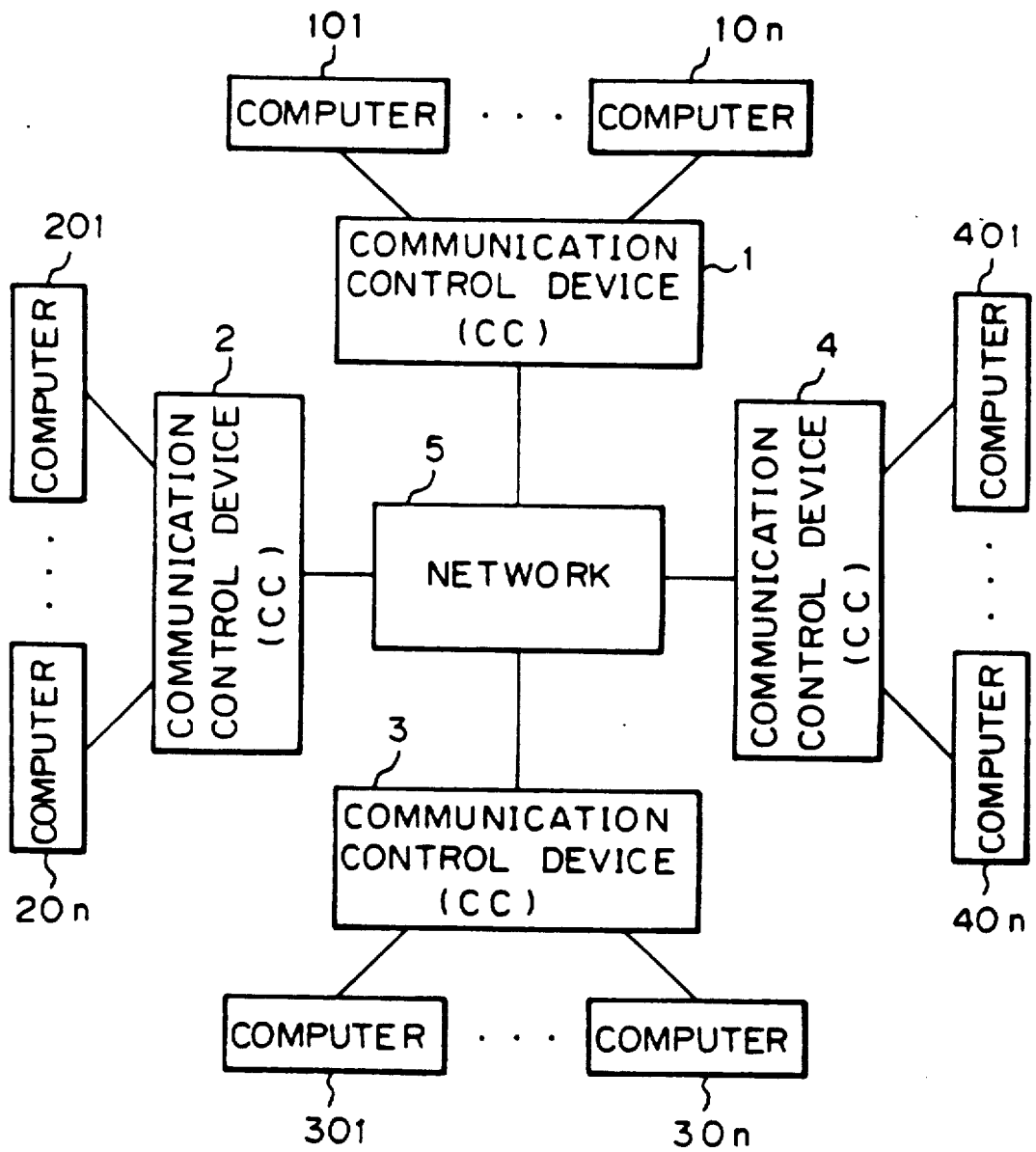
FIG. 1 shows a system of inter-computer communication to which the device according to the present invention can be applied.

As shown in FIG. 1, a plurality of computers 101 . . . 10n; 201 . . . 20n; 301 . . . 30n; 401 . . . 40n are interconnected via a plurality of communication control devices 1, 2, 3, and 4, and a network 5.

Figure 2:
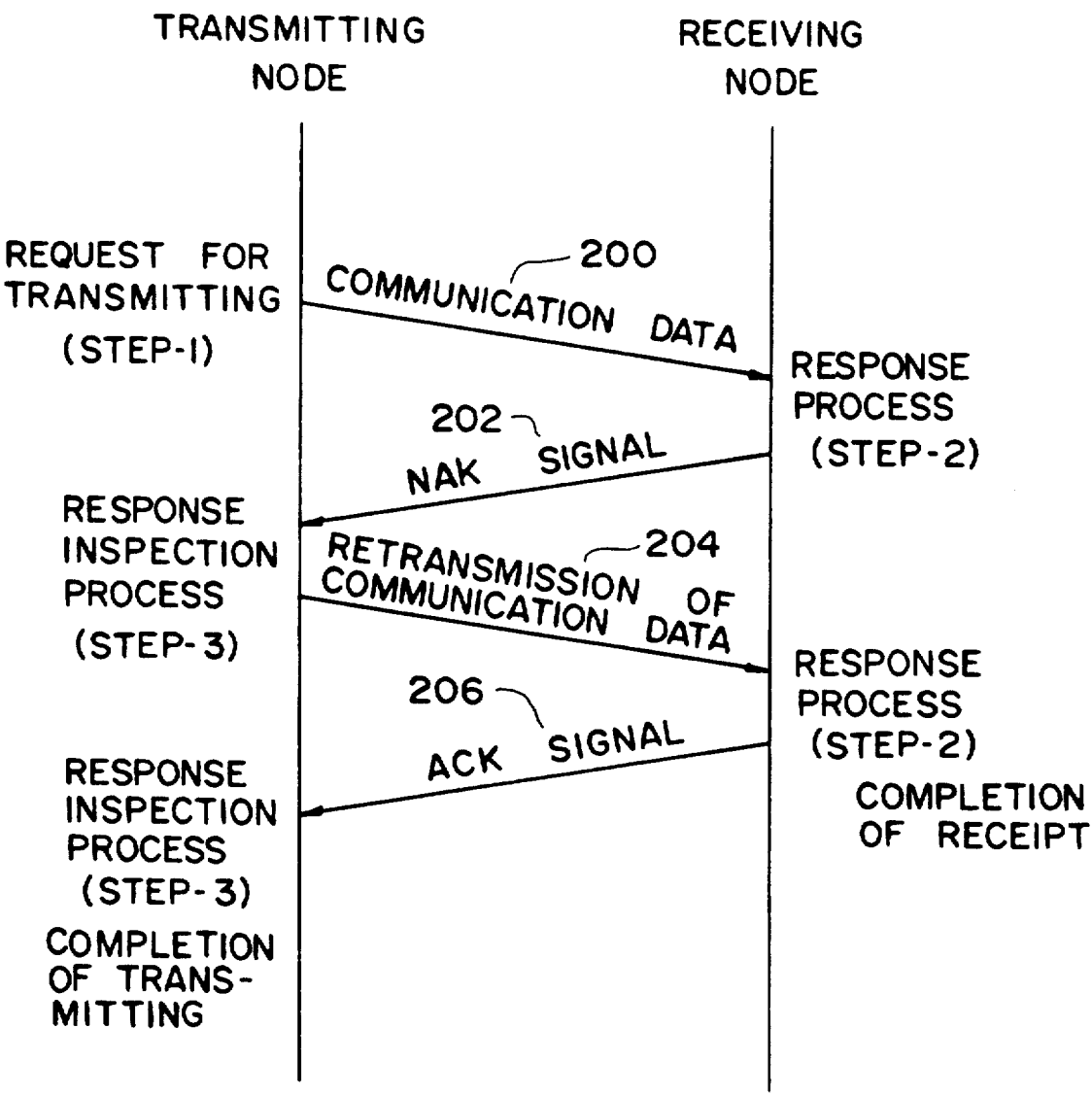
FIG. 2 shows an example of communication protocol used in a system of inter-computer communication.

An example of communication protocol used in each of the communication control devices 1, 2, 3, and 4 is shown in FIG. 2.

In accordance with a request for transmitting (STEP-1) at the transmitting node, communication data is transmitted 200 in the form of a communication data frame from the transmitting node, based on a predetermined protocol processing. Upon receipt of this communication data frame by the receiving node, a response processing of this communication data frame (STEP-2) is carried out.

When the receipt at the receiving node is a normal receipt, "ACK" information, which is acknowledge information, is returned to the transmitting node and the communication data is transmitted to a higher order computer to complete the receiving. On the other hand, when the receipt at the receiving node is an abnormal receipt, "NAK" information, which is negative acknowledge information, is returned 202 to the transmitting node.

At the transmitting node, a response data inspection process is carried out (STEP-3). When the response data is "NAK", a re-transmitting process 204 of the corresponding communication data is carried out, and when the response data is "ACK 206", the transmitting is completed.

In general, a communication control device as a node collects communications from a plurality of computers. Thus, a communication control device is required to carry out a plurality of transmitting and receiving processing operations.

Figure 3:
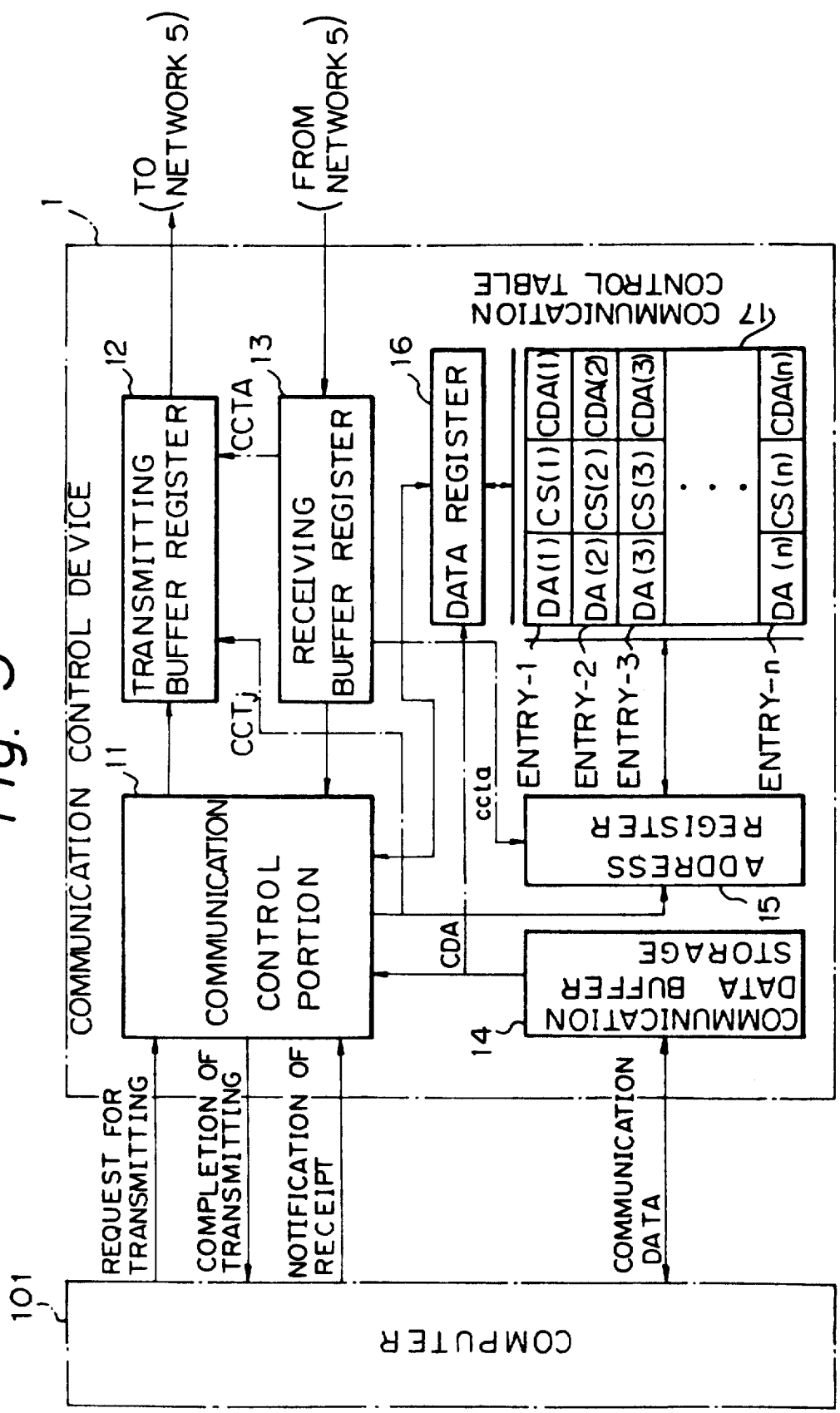
FIG. 3 is a schematic diagram of the communication control device according to an embodiment of the present invention.

A communication control device for a computer system according to an embodiment of the present invention is shown in FIG. 3. The system shown in FIG. 3 includes a computer 101 and a communication control device 1.

The communication control device 1 is constituted by a communication control portion 11, a transmitting buffer register 12, a receiving buffer register 13, a communication data buffer storage 14, an address register 15, a data register 16, and a communication control table 17. The communication control portion 11 and the communication data buffer memory 14 are connected to the computer 101 for which the communication control device 1 is operated. The transmitting buffer register 12, the receiving buffer register 13, and the communication data buffer memory 14 are connected to the communication control portion 11. The communication control table 17 is connected via the address register 15 and the data register 16 to the communication control portion 11. The transmitting buffer register 12 and the receiving buffer register 13 are connected through a transmission line to the network 5.

The communication control portion 11 carries out the control of the transmitting of communication data and response data, the control of receiving communication data and response data, the control of responding to the communication data, and the control of inspection of the response data.

The communication control table 17 is constituted by a series of entries: ENTRY-1, ENTRY-2, . . . ENTRY-n. In each of these entries, a transmitting destination address DA, communication state information CS, and a communication data buffer memory storing address CDA are stored or set. The communication state information CS indicates either a "vacant state", a "transmitting request state", or a "transmitting completion state".

Figure 4:
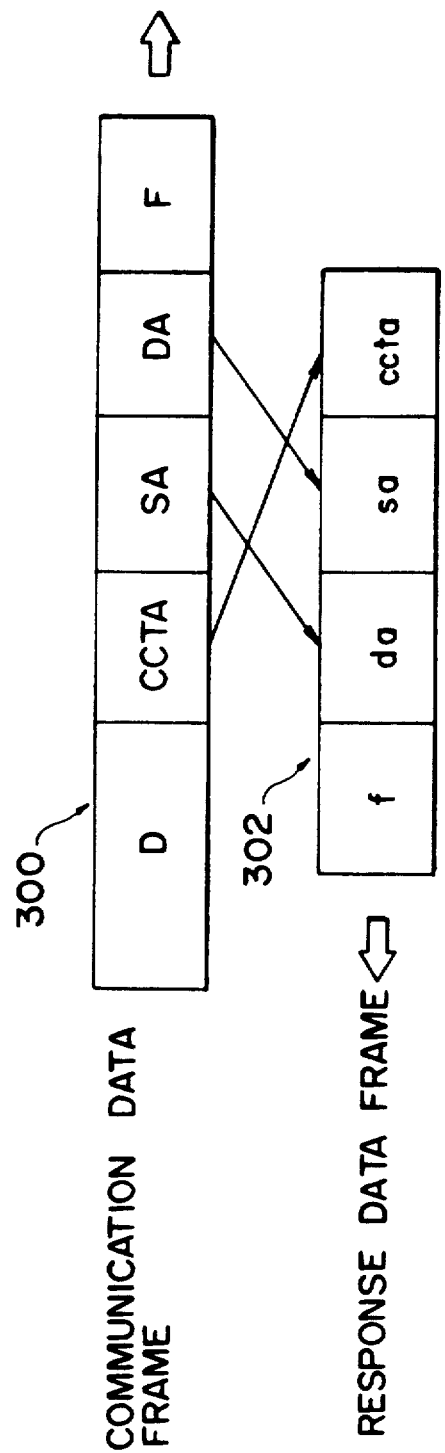
FIG. 4 shows an example of frame structures of the communication data and the response data used in the device of FIG. 3.

An example of a frame structure of the communication data and response data used in the device of FIG. 3 is shown in FIG. 4. The communication data frame 300 is constituted by a flag F, a transmitting destination address DA, a transmitting source address SA, a communication control table entry address CCTA, and communication data D.

The response data frame 302 is constituted by a flag f, a transmitting destination address da, a transmitting source address sa, and a communication control table entry address ccta.

In the flag F of the communication data frame, the information indicating the communication data is set. In the flag f of the response data frame, the response information "ACK" is set in the case of normal receiving, but the response signal "NAK" is set in the case of an abnormal receiving. In the receiving side, it is possible to discriminate between a communication data frame from the opposite side and a response data from the opposite side by inspecting the flags F and f.

In the transmitting destination address da of the response data frame, a communication data frame transmitting source address SA is set; in the transmitting source address sa of the response data frame, a transmitting destination address DA is set; and in the entry address ccta of the response data frame, an entry address CCTA itself is set.

The operation of the communication control portion 11 of the communication control device 1 will be described with reference to the flow charts shown in FIGS. 5, 6, 7, 8, and 9.

Figure 5:
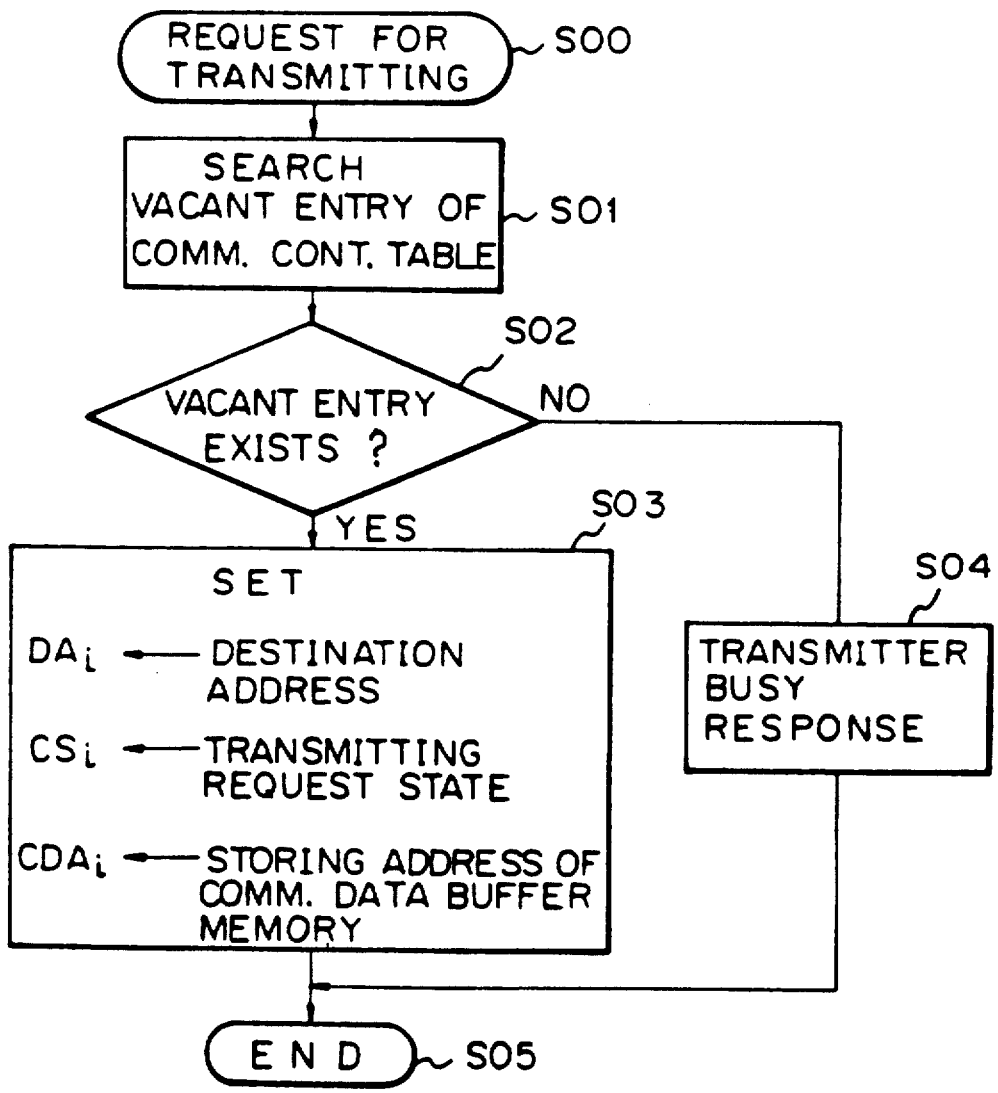

The transmitting request processing at the transmitting node is shown in FIG. 5. When a request for transmitting is delivered from the higher order computer (S00), the communication control portion 11 checks communication state information CS(1) to CS(n) of the communication control table to find a vacant entry of the communication control table (S01), which shows a "vacant state" of the communication state (CSi). When a vacant entry does not exist, a response that the transmitter is busy is delivered (S04) and the process in terminated. When a vacant entry ENTRY-i exists, the destination address for the transmitting request is stored in a transmitting destination address $DA_i$ of the communication control table 17 via the data register 16, the communication state $CS_j$ is set to the "transmitting request state", the communication data is stored in the communication data buffer storage 14, the storage address thereof is stored in the communication data address $CDA_i$ via chain line CDA (S03), and the process is terminated.

Figure 6:
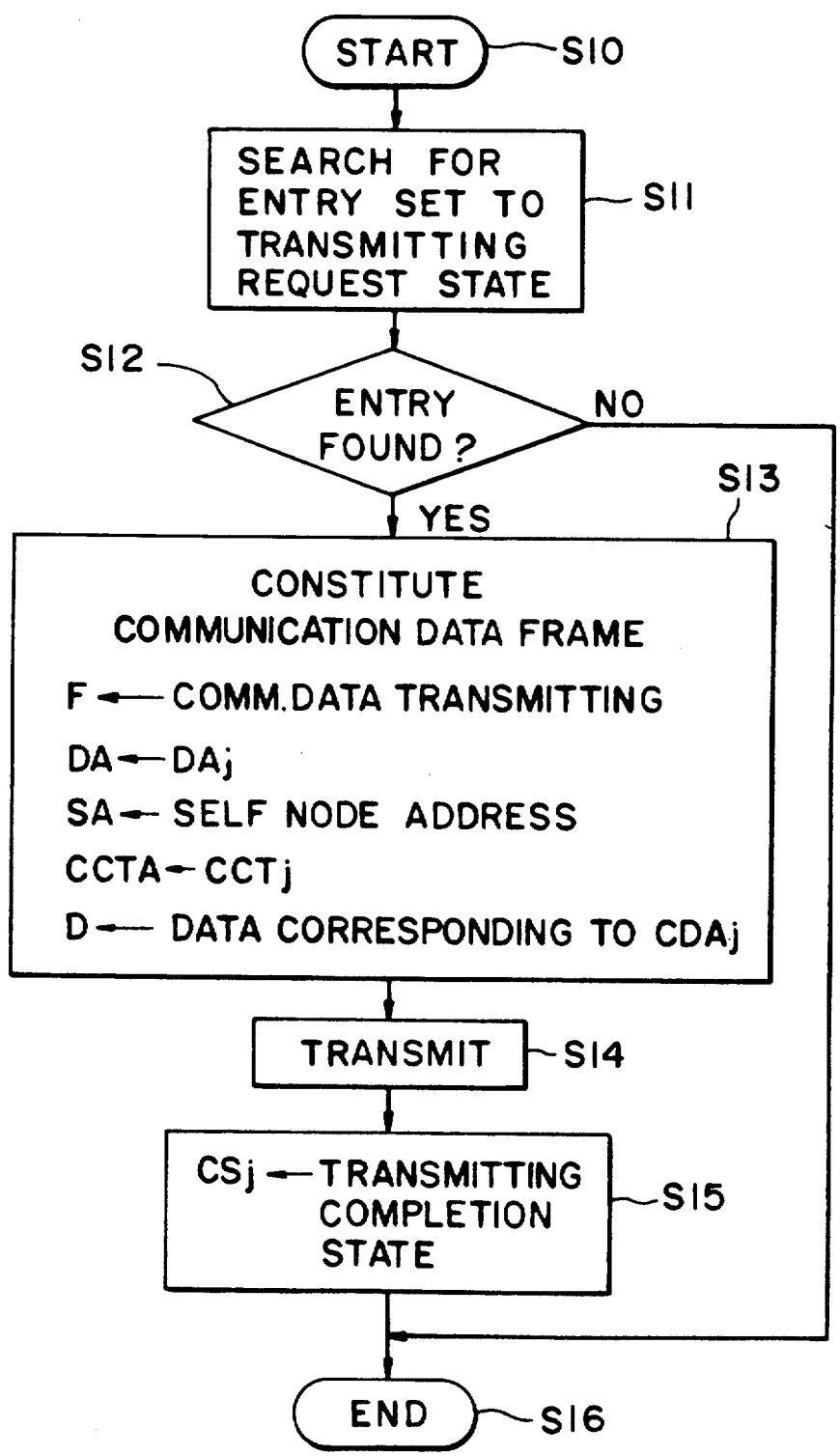

The transmitting control at the transmitting node is shown in FIG. 6. The communication states CS(1) to CS(n) of the communication control table 17 are searched (S11) to determine (S12) whether or not there is an entry which is set to the "transmitting request state". When there is no such entry, the process is terminated.

When there is an entry ENTRY-j having the entry address $CCT_j$ which is set to the "transmitting" request "state", the transmitting destination address $DA_j$ and the communication data address $CDA_j$ are read through the data register 16. In the transmitting buffer register 12, a communication data frame is formed according to the control of the communication control portion 11. In this communication data frame information is stored in a manner such that information indicating communication data is set to flag F, the transmitting destination address $DA_j$ is set to the transmitting destination address DA, a fixed self node address is set to the transmitting source address SA, the communication control table entry address $CCT_j$ is set to the communication control table entry address CCTA (FIG. 3, chain line $CCT_j$), and data corresponding to the communication data address $CDA_j$ of the communication data buffer memory 14 is set to the communication data D (S13).

The transmitting processing of this communication data frame is then carried out (S14). Finally, and the transmitting state $CS_j$ of the corresponding entry ENTRY-j of the communication control table 17 is set to the "transmitting completion state" (S15), so that the transmitting control of the communication data is terminated.

The receiving control of the communication data and the response data at the transmitting node is shown in FIG. 7. The receiving buffer register 13 receives the signal from the network and inspects the flag therein, and the communication control portion 11 decides (S21) whether the received signal is a communication data frame or a response data frame. In correspondence with the state of the flag, either a response processing of the communication data (S22) or an inspection processing of the response data is carried out (S23, S24).

The response processing of a communication data at the receiving node is shown in FIG. 8. When a communication data frame is received, the received communication data frame is once stored in the communication data buffer memory 14 to determine whether or not the communication data is received correctly, and a response data frame for response is formed in the transmitting buffer resister 12.

When correctly received, "ACK" is set in the flag f of a response data frame (S33), but when not correctly received, "NAK" is set (S38). Also, a transmitting destination address da, a transmitting source address sa, and an entry address ccta are set (S34, S39). The communication control portion 11 carries out the transmitting processing of the response data frame which is formed in the transmitting buffer register 12 (S35). In the case of normal reception, the communication control portion 11 also carries out a notification of successful receipt of data to the higher order computer 101 (S36) and in the case of a normal transmitting processing of the communication data D (S37).

The response data inspection processing, i.e., ACK processing or NAK processing at the transmitting node, is shown in FIG. 9. When a response data frame is received, the entry address ccta thereof is stored in the address register 15, and an access to the communication control table 17 is carried out (S51).

When the flag f is "ACK", the communication state CS(k) of the corresponding entry ENTRY-k is reset to a "vacant state" (S54), the communication data transmitting completion is sent to the higher order computer (S55), and the process is terminated.

On the other hand, when the flag f is "NAK", the communication state CS(m) of the corresponding entry ENTRY-m is returned to the "transmitting request state" (S56), a re-transmitting request is carried out, and the process is terminated.

As shown in these flow charts, the entry address CCTA of the communication control table 17 is included in a communication data frame, and a return is carried out by including this entry address CCTA in a response data frame of "ACK" or "NAK". Note, the entry address CCTA, ccta can use either absolute or relative addressing. Accordingly, it is possible for the transmitting side to access the transmitting control information of the relevant communication data stored in the communication control table 17 based on the entry address ccta of the response data frame.

Therefore, in the device of FIG. 3, the search of the communication control table 17 is carried out within the access time. As a result, the search of the communication control table 17 can be achieved in several tens of nanoseconds through several hundreds of nanoseconds, regardless of the number of entries of the communication control table 17. Therefore, the speed of search is enhanced to a great extent, compared to the prior art software processing type search.

As a modified embodiment of the present invention, it is possible to add entry addresses of communication control tables of a corresponding pair of communication control devices to a communication data frame and a response data frame. In this modified embodiment, the speed of the response processing of a re-transmitted communication data frame at the receiving side can be enhanced.

I claim:

1. A communication control device connected as a source node and a destination node through at least one network to a computer system for processing communication data in accordance with a communication protocol, said device comprising:

a communication control information storage means for storing communication control information, and including
a communication table storing the communication control information at an address;

transmission control means for setting the address of said communication control information in a communication data frame, and for transmitting to the at least one network the communication data frame having the address of said communication control information set therein;

reception control means for receiving from the at least one network a communication data frame and for sending a response data frame which includes the address of said communication control information; and response inspection processing means for inspecting the response data frame received by said reception control means, for accessing said communication control information storage means using the address of said communication control information obtained from the response data frame, for carrying out transmission completion control or retransmission control based on the communication control information obtained from the accessing of said communication control storage means.

2. A device according to claim 1, further comprising response processing means for inspecting the communication data frame received by said reception control means of the destination node, for setting information as a result of the inspecting as well as the address in the response data frame.

3. A device according to claim 2, wherein the response processing means includes means for forming and transmitting the response data frame with respect to the communication data frame received by said reception control means from a similar communication control device.

4. A device according to claim 3,
wherein the address of the communication control information is one of a destination node address and a source node address, and
wherein said response processing means includes means for forming the response data frame by changing the destination node address of the communication data frame to the source node address of the response data frame and by changing the source node address of the communication data frame to the destination node address of the response data frame, and for returning the response data frame to the source node.

5. A device according to claim 1, wherein the address is determined by using an absolute address of said communication table.

6. A device according to claim 1, wherein the address in formed using a relative address of said communication table.

7. A device according to claim 1,
wherein the communication table has a predetermined capacity, and
wherein communication state information, communication destination address information, and communication data address information are stored in the communication control table.

8. A device according to claim 7,
wherein the communication control table has at least one vacant area, and
wherein said transmission control means includes means for searching the communication control table to discriminate the communication state information and for storing, as the communication state information, a transmission destination address, a transmission request state, and a communication data buffer address, into the at least one vacant area.

9. A device according to claim 8, wherein said transmission control means includes construction means for constructing the communication data frame with a self node address corresponding to a source node set in the transmission request state.

10. A device according to claim 9, wherein said construction means includes means for storing in the communication data frame, the address within the communication control table of the source node, the self node address, a destination address, and the communication data.

11. A device according to claim 7, wherein the response inspecting processing means determines whether the response data frame is received normally, and based on the result of this determination, carries out one of the transmission completion control and the retransmission control.

12. A device according to claim 1, wherein the computer system includes a higher order computer, and
wherein said communication control device is provided between the network and the higher order computer and carries out communication control.

13. A device according to claim 12, wherein said communication control device reports completion of data transmission to the higher order computer upon completion thereof.

14. A device according to claim 12, wherein said communication control device transmits the communication data to the higher order computer upon receiving the communication data.

15. A method for transmitting data between a source node and a destination node of a network, each node comprising a communication control device having a communication control table with a plurality of addressable entries, said method comprising the steps of:
(a) receiving a request for transmitting data at the communication control device corresponding to the source node;
(b) storing, as communication control information, in a vacant entry of the communication control table, communication state information, communication data address information, and a destination address;
(c) forming a communication data frame including an entry address corresponding to the vacant entry, a source address, a destination address, and the data;
(d) transmitting the communication data frame to the destination node;
(e) receiving the communication data frame at the communication control device corresponding to the destination node;
(f) forming, at the destination node, a response data frame including the entry address obtained from the communication data frame, the source address obtained form the communication data frame as the destination address, and the destination address obtained from the communication data frame as the source address;
(g) transmitting the response data frame to the source node;
(h) receiving the response data frame at the communication control device corresponding to the source node; and
(i) updating the communication state information in the communication control table of the communication control device corresponding to the source node at the entry address contained in the response data frame in dependence upon successful completion of steps (d) and (e).

16. A method according to claim 15,
wherein said forming in step (f) further includes a flag in the response data frame indicating successful completion of steps (d) and (e), and
wherein said updating in step (i) updates the communication state information in dependence upon the flag in the response data frame.

* * * * *

UNITED STATES PATENT AND TRADEMARK OFFICE
CERTIFICATE OF CORRECTION

PATENT NO. : 5,077,655

DATED : December 31, 1991

INVENTOR(S) : Jinzaki

It is certified that error appears in the above-identified patent and that said Letters Patent is hereby corrected as shown below:

Col. 6, line 66, change "frame." to --frame, and for transmitting the response data frame.--

Signed and Sealed this

Twenty-second Day of June, 1993

Attest:

MICHAEL K. KIRK

*Attesting Officer*     *Acting Commissioner of Patents and Trademarks*